Aug. 3, 1971  J. R. PRENDERGAST  3,597,181
METHOD AND APPARATUS FOR TRANSFER AND
ORIENTING OF GLASS MAKING MOLDS
Filed Aug. 21, 1968  3 Sheets-Sheet 1

INVENTOR.
JOHN R. PRENDERGAST
BY D. R. Birchall
W. A. Schaich
ATTORNEYS

INVENTOR.
JOHN R PRENDERGAST
BY
ATTORNEYS

INVENTOR.
JOHN R PRENDERGAST
BY D. R. Birchall
W. A. Schaich
ATTORNEYS

United States Patent Office 3,597,181
Patented Aug. 3, 1971

3,597,181
METHOD AND APPARATUS FOR TRANSFER AND ORIENTING OF GLASS MAKING MOLDS
John R. Prendergast, Columbus, Ohio, assignor to Owens-Illinois, Inc.
Filed Aug. 21, 1968, Ser. No. 754,318
Int. Cl. C03b 9/18
U.S. Cl. 65—71
11 Claims

ABSTRACT OF THE DISCLOSURE

An apparatus for transferring and orienting the ring portion of a glass forming mold. An apparatus with a mechanism for disengaging the top ring of a glass article forming mold and translating it to an orienting station. An orienting station capable of rotating the disengaged top mold ring. Mechanism associated with the apparatus for translating the oriented mold ring from the orienting station to a mold. A method of orienting the top ring section of a glass forming mold by grasping the mold ring, disengaging it from the mold, translating the mold ring to an orienting station, orienting the mold ring and returning it to a mold at a location different from the initial pick-up location.

---

This invention relates to a method and apparatus useful in the manufacture of hollow articles by the combined pressing and centrifugal molding action, more particularly the present invention relates to the formation of generally frusto-pyramidal shaped hollow glass articles having large ends of non-circular contour that are molded to finished dimensions by centrifugally forcing the molten glass against a ring portion of the mold.

The present invention is particularly adapted for use in the manufacture of hollow glass funnels or body members of cathode-ray tube envelopes. The cathode-ray tubes fabricated by the present invention are used in the television industry.

Both monochromatic and polychromatic television pictures are transmitted having a rectangular pattern with a screen ratio of 4:5 and rectangularly shaped screens are conventional for recreating and displaying such pictures. Previously, the prior art of manufacturing television picture tube envelopes provided circular viewing screens; however, such screens became obsolete because of the fact that peripheral areas of the transmitted pictures were lost and they could not be efficiently recreated on a screen of altogether different geometric outline. As the popularity of larger sizes of viewing screens has increased, there has been a transition from round cathode-ray tubes to rectangular tubes which are now employed almost exclusively in the industry. More recently, the so-called wide-angle "square-look" tube envelopes have attained still further popularity in providing both larger and more definitely rectangular contoured viewing screens. Such envelopes possess a reduction in overall tube length because of wide electron-beam deflection angles. A faceplate or viewing screen is fabricated by pressing or other well-known glass forming techniques.

As presently manufactured, a cathode-ray picture tube envelope or bulb is made by separately fabricating a hollow glass funnel which constitutes the tube body portion. The funnel and faceplate are subsequently sealed together at their complemental edges of similar contour as by thermal fusion or by other solder techniques employed especially in polychromatic receiving tubes.

More recently, the hollow frusto-pyramidal funnel portion of the rectangularly contoured cathode-ray tube has been made by centrifugal molding action wherein a charge of molten glass is deposited in the apex area of a hollow upwardly-facing mold and the mold is immediately rotated about its vertical axis to form the hollow body portion of the funnel. The large open end of the funnel has, in the past, been initially formed to the desired contour with a moil portion attached to the large or open end of the funnel. The moil was subsequently trimmed from the funnel before sealing to the faceplate member. After the moil had been trimmed from the large end of the funnel, the remaining glass edge was sharp and somewhat uneven in peripheral contour. The unevenness in edge contour was not a serious problem in monochromatic receiving cathode-ray tube funnels since they were attached to their respective faceplates by actually welding or thermally fusing the glass together. However, in the uniting of funnels to faceplates adapted for polychromatic reception, the ragged edge formed by moil separation with the funnel does present a problem since colored television funnels and faceplates are united by a cold solder technique that does not melt the edges of the glass. Consequently, after the moil section of a color receiving funnel has been separated therefrom, the uneven edge must be ground so that it falls in a plane normal to the fore and aft axis of the overall picture tube. The grinding operation for funnels is time consuming, expensive, and subjects the ware to additional handling which inherently results in some breakage losses.

Normally, in the manufacture of funnel members for cathode-ray tube envelopes having both circular and rectangular large ends, it has been conventional to introduce a charge of molten glass into an upwardly-facing open-topped mold. A fluted plunger is then utilized to distribute the bulk of the molten glass charge over the apex portion of the mold. After the apex portion of the glass charge has been well defined by the plunger, the mold is then rotated to distribute centrifugally the major portion of the glass charge over the inside wall of the mold. Such forming of the apex area of the funnel is necessary to achieve formation of the funnel vortex region with desired wall thickness and accurately-contoured outwardly-flaring surfaces in an area of the mold where small moments of inertia are applied to the molten glass charge upon centrifugal casting. The utilization of a plunger having flutes also creates the proper electron path clearance in the diagonals of the cathode-ray tube. An example of the formation of cathode-ray tube envelopes and methods of forming the body portion thereof are described and illustrated in U.S. Pat. No. 3,132,018 to Prendergast et al. which issued on May 5, 1964 and is titled Centrifugal Casting Apparatus for Making a Glass Article.

Since the large end of the cathode-ray tube funnel is ideally of planar contour, attempts have been made to spin cast the funnel to final configuration, including the large peripheral edge. In order to spin the entire funnel to final configuration at its large end, a two-piece mold is required. The top ring is affixed to the large end of the frusto-pyramidal portion of the mold, the molten charge is dropped therethrough as heretofore described, and the glass progresses up the inside sloping walls of the mold as it is spun very rapidly. As the molten glass reaches the ring on the top of the mold, its further advancement up the inclined walls of the funnel mold is halted, thus producing a planar top edge. Subsequent removal of the completed funnel necessitates the removal of the top ring against which the molten glass was spun.

One method of removing the top ring has been set forth in U.S. patent application Ser. No. 661,665 filed Aug. 18, 1967; however, the removal and orienting of the ring portion of the mold required a considerable amount of time; consequently, the apparatus described in patent application Ser. No. 661,665 could not keep pace with recently developed higher speed centrifugal casting machinery.

The present invention is directed toward overcoming the difficulties inherent in coupling and disengaging a ring section of a mold with its complemental base portion. An inherent advantage of the present invention resides in a unique reverse transfer system involving a minimum number of mold rings, thus avoiding the necessity of having mold rings on molds at cooling and takeout stations where they could be troublesome. Basically, the apparatus of the present invention comprises three sets of arms cantilevered from a common support and spaced equidistant from each other. The sets of arms are capable of grasping and removing a mold ring from a mold, translating the removed mold ring to a ring orienting stand and releasing the mold ring so that it can be oriented. The sets of arms also are equipped to lift an oriented mold ring from a ring orienting stand and return the oriented mold ring to a mold that is positioned at a location other than the location where the mold ring is removed from the mold.

Accordingly, it is the primary object of the present invention to provide an apparatus for removing the ring portion of a television tube envelop mold that has an essentially rectangular configuration at its large end.

Another object of the invention is to provide an apparatus that can orient the ring portion of a mold so that it can be reunited with another mold of similar rectangular configuration.

A further object of the present invention is to provide a method of forming the funnel portion of a cathode-ray tube of non-circular configuration which is formed at the large end of the application of centrifugal force applied against the molten glass to force it against a removable mold ring.

Another object of this invention is to provide a method of forming a frusto-pyramidal shaped hollow glass funnel member from a molten glass charge by pressing the apex portion into configuration and distributing the remaining flowable molten glass charge into a rectangularly-disposed pattern for centrifugal casting including the formation of an edge, at the large end of the funnel, against a removable ring that imparts a generally planar contour to the edge of the funnel.

The general nature of the present invention, as well as other objects and advantages thereof, will become apparent to those skilled in the art from the following detained description when taken in conjunction with the included sheets of the drawings in which are illustrated the preferred embodiments of the present invention.

While the present invention will be described hereinafter as specifically applicable to the forming of hollow glass funnel members of cathode-ray picture tube envelopes, it will be appreciated by those skilled in the art that the principles of the invention are equally applicable to forming many other types of hollow articles having modified frusto-conical or frusto-pyramidal configurations.

Figure 1:
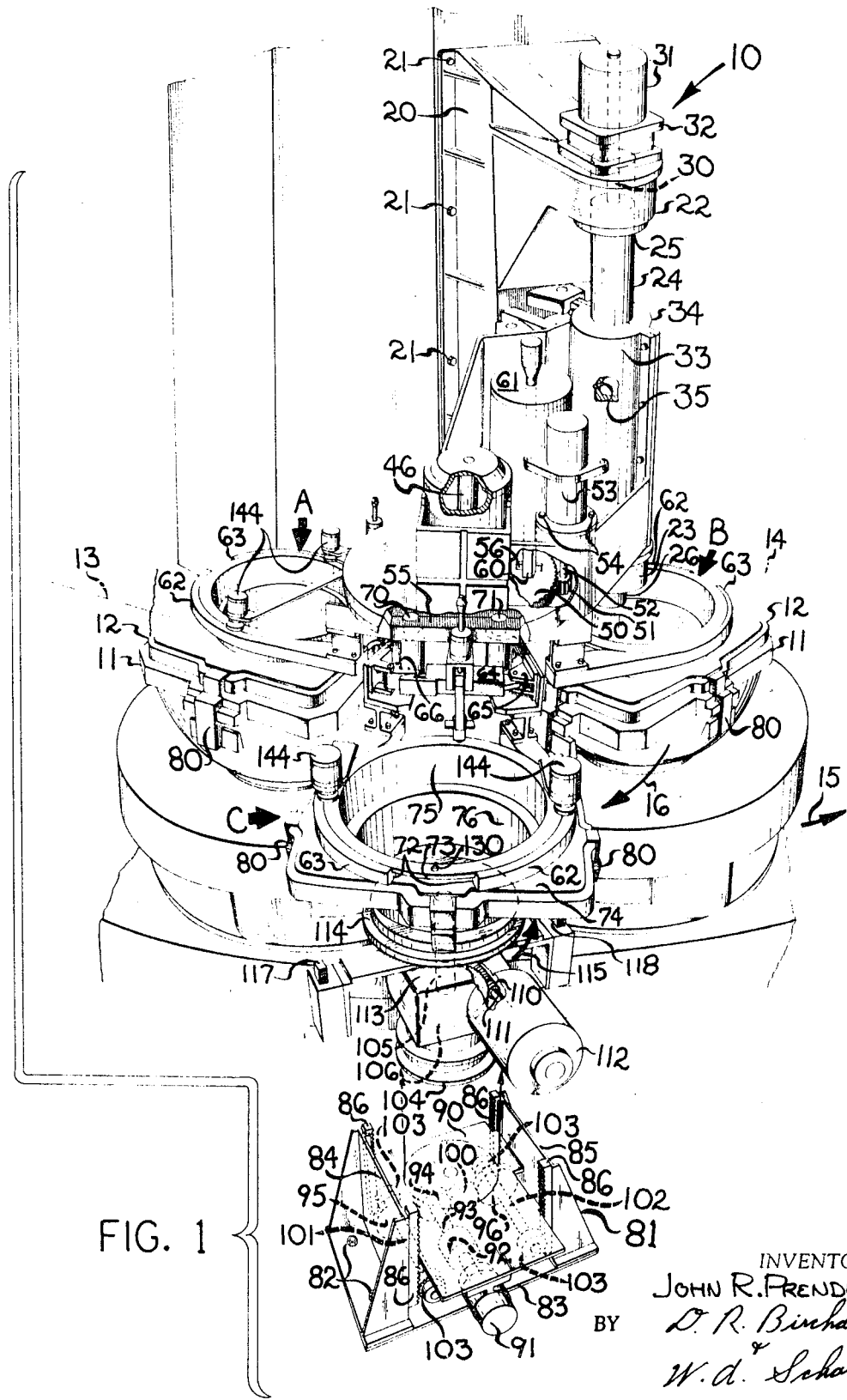
FIG. 1 is a part-sectional perspective view showing a generally profile view of the apparatus of the invention.

Referring now to the drawings and specifically to FIG. 1 the entire apparatus is shown at 10. Apparatus 10 is a perspective view which comprises practically all of the essential components of the invention. In addition, FIG. 1 shows a portion of the apparatus utilized in centrifugally forming the frusto-pyramidal shaped glass funnels for cathode-ray tubes.

Apparatus 10 is supported from the stationary central column of a centrifugal casting machine so that it is in suspended position over a large rotatable mold carrying table. The rotatable table of the centrifugal casting machine supports an array of circumferentially-spaced funnel molds 11. The molds 11 and the entire centrifugal casting machine are not considered as a part of the apparatus of the present invention; however, portions thereof are illustrated and described so that complete understanding of the present invention may be had. A more complete description of the centrifugal casting machine is to be found in U.S. patent application Ser. No. 634,706 filed Apr. 28, 1967.

Positioned immediately above funnel mold 11 is a mold ring 12 which rests on the top of the funnel mold 11. Mold ring 12 can be lifted entirely free from funnel mold 11 to facilitate the removal of the glass funnel that is fabricated therein by the spin cast method. The primary purpose of mold ring 12 is for the formation of, for example, a glass television picture tube funnel that has a finished edge at the large end thereof. Ring 12 provides a stop for the molten glass as it climbs up the sloping walls of funnel mold 11 under the influence of centrifugal forces associated with very rapid spinning of funnel mold 11.

Once the glass article, which will be hereinafter referred to by way of example as the glass funnel, has attained its desired geometric configuration, ring 12 can be lifted free of funnel mold 11 thus permitting the same ring to be utilized on another funnel mold 11. The removal of ring 12 from the funnel mold 11 must be accomplished very rapidly once the funnel mold has been momentarily stopped for the purpose of ring removal. After the ring has been removed from the funnel mold, the mold is immediately accelerated to a fairly high angular velocity so that the newly formed glass funnel will not flow or bend from its as formed configuration. Subsequent cooling of the glass funnel permits its removal from the mold. After the glass funnel has been removed from the funnel mold 11, the mold is oriented by the apparatus upon which it is spun and translated in an arcuate path. Thus, the orienting of the funnel mold always arranges the mold so that it is in the position represented by axis line 13 of FIG. 1. Also shown in FIG. 1 is axis 14 which represents only one of the infinite positions that ring 12 can assume when it is picked up and disengaged from funnel mold 11. Therefore, it will now become obvious why ring 12 must be oriented before it can be set down upon the following mold.

The funnel molds which are translated in a circular path by the rotating table of the centrifugal casting machine pass beneath two of the three sets of arms associated with apparatus 12. The three sets of arms of the present invention occupy three distinct stations which will be identified as stations A, B, and C. Station A is on the left-hand side of FIG. 1 and station B is on the right-hand side of FIG. 1. Station C is located on the lower central portion of FIG. 1. Stations A and B coincide with, for example, two of the eight mold stations that are spaced circumferentially around the rotatable table of the centrifugal casting machine.

Thus, assuming a rotational direction of the table as shown by arrow 15, it is apparent that all of the funnel molds 11 first pass beneath station A of apparatus 10. Additional rotation of the table moves each mold from station A to station B of apparatus 10.

The three sets of arms associated with stations A, B, and C move in a direction opposite to that of the table. The direction in which the arms rotate is shown by arrow 16.

Apparatus 10 lifts a mold ring from the mold at station B and translates it through a non-linear path to station C where the mold ring is deposited upon an orienting table for proper orienting. As one set of arms is moving a mold ring from station B to C another set of arms lifts an oriented mold ring from the orienting table at station C and translates it through a non-linear path to station A where the oriented mold ring is deposited upon an oriented mold.

Referring now to FIG. 1 in more detail and,, as previously stated, the main portion of apparatus 10 of the present invention is suspended from a centrally located stationary structure of a centrifugal casting machine. Support casting 20 of the present invention is attached to the stationary structure of the centrifugal casting machine by bolts 21. Two support bosses 22 and 23 are cantilevered in a horizontal direction from the vertically suspended main body portion of support casting 20. Upper support boss 22 is apertured as is lower support boss 23. A main load carrying column 24 is positioned through aperture 25 in upper support boss 22 and also through aperture 26 in lower support boss 23. Column 24 is held firmly against lateral movement within apertures 25 and 26; however, column 24 may slide freely in a vertical direction. The top of column 24 is attached to the piston rod 30 of actuator 31. Actuator 31 is securely mounted from the framework 32 which is cantilevered in a vertical direction from the top of upper support boss 22. The main column 24 can be moved up and down by reversing the hydraulic pressure from one side to the other of the piston associated with actuator 31. Column 24 can also be rotated within bosses 22 and 23. A torque-free connection (not shown) is interdisposed between the top of column 24 and the lower end of piston rod 30. Thus from the foregoing description, it can be ascertained that column 24 is restricted from lateral movement; however, it can move in a vertical direction and can rotate in an arcuate manner.

A pivot casting 33 is mounted on the central region of main column 24 and is held firmly in position by cap 34 and lock pin 35. The pivot casting 33 and cap 34 can also be seen in FIG. 2. The movement of pivot casting 33 is controlled by actuator 36 (FIG. 2) which is pivotally mounted to support casting 20 by yoke 40 and pins 41. The piston rod 42 of actuator 36 is pinned to rod 43 which is attached to pivot casting 33 through upper bracket 44 and lower bracket 45. The length of pin 43 is several times the thickness of the fitting on the end of piston rod 42. As the entire pivot casting 33 is raised and lowered thrugh the biasing force supplied by the main column and attached actuator 31, rod 43 which is attached to pivot casting 33 will move through the connecting aperture in the end of piston rod 42. Regardless of the vertical positioning of pivot casting 33, it can be rotated about main column 24 under the influence of actuator 36.

Figure 2:
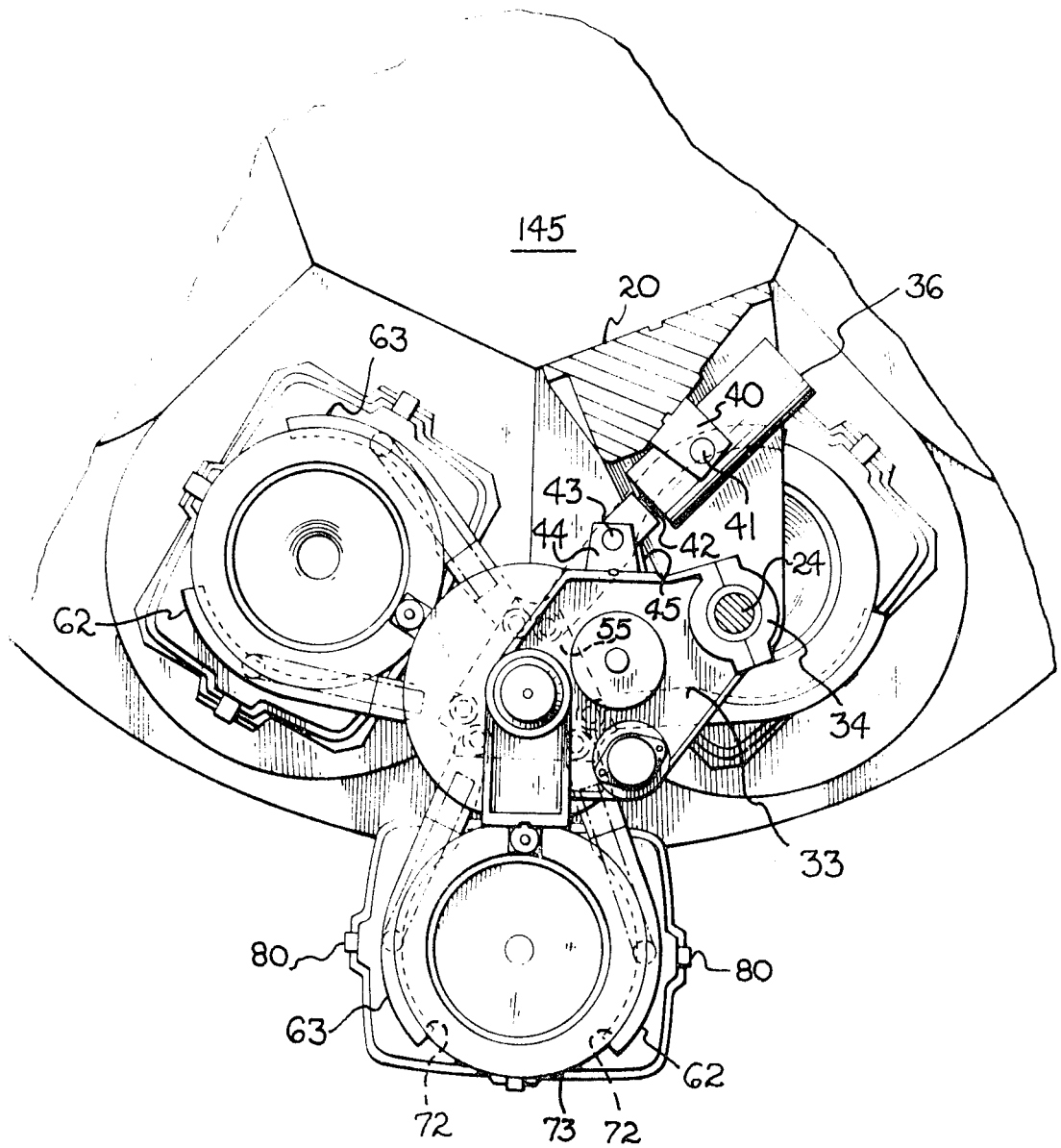
FIG. 2 is a sectionalized top view of the overall apparatus including the centrifugal casting machine which co-acts with, and provides support for the present invention.

A support shaft 46 (see center FIG. 1) is mounted within pivot casting 33. Support shaft 46 is coupled integrally with large gear 50. The support shaft and gear combination 46, 50 is mounted within pivot casting 33 for rotation. The movement of support shaft 46 is also restricted in an axial direction. Large gear 50 meshes with, and is driven by, pinion gear 51. Pinion gear 51 is fixedly attached to drive shaft 52 which, in turn, is powered by motor 53. Motor 53 is firmly attached to pivot casting 33 by fasteners such as bolts 54. Thus, it can be seen from FIG. 1, and FIG. 2 that pivot casting 33 houses support shaft 46 which is driven in a rotational direction by means of motor 53 which transmits its power through shaft 52 and gears 50 and 51. In addition to being mounted within pivot casting 33, support shaft 46 protrudes in a downward direction through the bottom of pivot casting 33 and is rigidly attached to pivot triangle 55. Pivot triangle 55 can be seen through the cut-away section in FIG. 1 immediately beneath support shaft 46. FIG. 2 also shows in dotted lines the outline of pivot triangle 55.

As will be explained hereinafter, it is desirable to stop the pivot triangle at certain predetermined positions around its circular path of travel. In order to provide for positive orienting of pivot triangle 55, a stop system has been provided for within pivot casting 33. A bar 56 is anchored to the top surface of large gear 50. A stop rod 60, which is controlled by actuator 61, coacts with bar 56. Actuator 61 is mounted in an upward direction from a boss that has been integrally cast along with the remainder of the pivot casting 33. Stop rod 60 is connected to the piston rod (not shown), of actuator 61 and can be raised and lowered as desired. During actual operation and through the utilization of microswitches and cams, the rotation of large gear 50 is monitored and as a stop location is approached motor 53 receives an input to slow down; therefore, large gear 50 angularly deaccelerates so that bar 56 which is attached thereto will come to a stop as it reaches the extended stop rod 60.

Additional reference will now be made to pivot triangle 55 which has, as previously been pointed out, is powered for rotation beneath pivot casting 33. Pivot triangle 55 has attached thereto three pairs of arms 62, 63. Each pair of arms 62, 63 are essentially identical with one another and are spaced as near as possible 120 degrees apart. Arms 62 and 63 can be seen in FIGS. 1 and 2. Actuator 64 is interdisposed between arms 62 and 63. One end of actuator 64 is pivotally attached to arm 62 such as at attachment point 65. The piston of actuator 64 is attached to arm 63 at attachment point 66. The application of fluid pressure to one side or the other of the piston of actuator 64 will cause arms 62 and 63 to move together or apart as desired. Actuator 64 will be commented upon in greater detail under a description of FIG. 3. Arms 62 and 63 are cantilevered very rigidly from pivot triangle 55 in a vertical sense; however, arms 62, 63 are free to pivot laterally around pins 70 and 71 which connect the arms to the pivot triangle 55.

The outer extremities of arms 62, 63 are curvilinear and each pair of arms coacts to span a considerable arcuate length of a mold ring. Each arm 62, 63 contains a radially inwardly extending flange 72 that is adapted for grasping a complementary radially outwardly extending flange 73 of mold ring 12.

Figure 4:
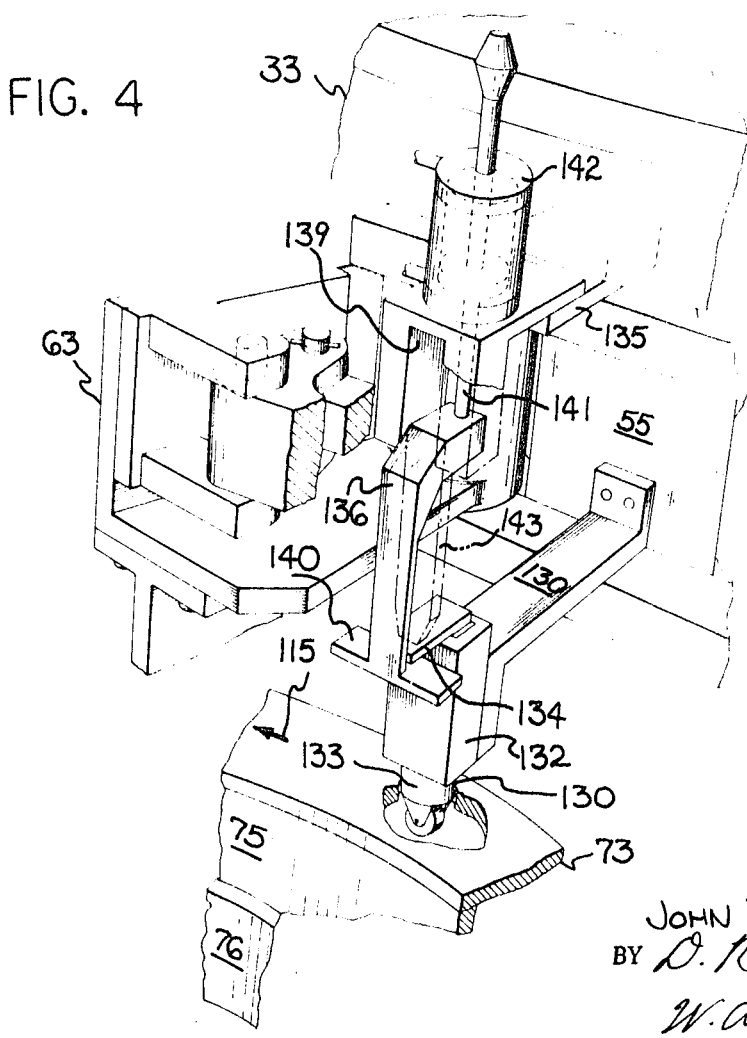
FIG. 4 is a perspective view, part in section, of the locking mechanism that prevents mold rings from rotating while being translated.

Flange 73 of mold ring 12 is of annular configuration and is located in the central section of deck plate 74 which forms the top covering for mold ring 12. A cylindrical section 75, 76 is attached to flange 73 and extends down through deck plate 74. The exterior of cylindrical section 75 is rigidly attached to deck plate 74. The lower end of cylindrical section 76 is adapted to coact with turntable 114 as shown in FIGS. 1 and 4. The deck plate 74 is attached along its outward peripheral extent to the thick exterior section of mold ring 12. Mold ring 12 interlocks in an engageable and disengageable manner with funnel mold 11. Centrifugal latches, associated with mold ring 12 are shown at 80 in FIG. 1.

Another part of the present invention that may or may not be directly connected to the primary structure of overall assembly 10 is the ring orienter 81 which can be seen in the lower front portion of FIG. 1. Ring orienter 81 is phased in with the rest of the assembly from an operational standpoint even though it is not necessarily integrally attached. Ring orienter 81 is mounted by bolts 82 to any convenient structure such as, for example, the floor. As will become obvious from the following description, it is necessary that the ring orienter is located directly beneath station C of the overall apparatus.

The ring orienter 81 has a flat plate base 83 that has mounted on both ends thereof upright brackets 84 and 85. Gear racks 86 are attached to the juxtaposed inner faces of brackets 84 and 85. A support plate 90 is interposed between the four upright gear racks 86. For purpose of simplifying the drawing the actual mounts and trunnions for the following parts have been omitted. Motor 91 is anchored by an appropriate mount to the bottom side of support plate 90. A drive coupling 92 is attached to the shaft of motor 91. The drive coupling 92 is keyed to a shaft 93 which terminates with drive gear 94. Drive gear 94 meshes directly on the left-hand side, as viewed in FIG. 1, with gear 95. Drive gear 94 is also connected to gear 96 by means of idler gear 100. Both gears 95 and 96 are centrally supported on shafts 101 and 102 respectively. Shafts 101 and 102 contain gears 103 on each end thereof. Gears 103 mesh directly with gear racks 86. When motor 91 is activated support plate 90 will be driven either up or down the distance traversed by gear racks 86.

Support plate 90 has mounted on the top thereof orienter mechanism 104. In FIG. 1 orienter mechanism 104 is shown in exploded view; hence, it is above its actual mounting position upon the top of support plate 90. A vertically aligned shaft 105 is journaled by conventional means within orienter mechanism 104. A gear 106 is attached to the lower end of vertically aligned shaft 105. A worm gear 110 engages with the peripheral teeth of gear 106. Worm drive gear 110 is powered through shaft 111 which, in turn, is coupled to motor 112. Motor 112 is securely attached to the framework of orienter mechanism 104.

Vertically aligned shaft 105 protrudes through the top cover 113 of orienter mechanism 104. A turntable 114 is supported from the top of vertical shaft 105. From the preceding discussion, it is evident that when motor 112 is activated, turntable 114 will rotate. The rotational direction of turntable 114 is shown by arrow 115. Stop brackets 117 and 118 are shown attached to the support structure beneath top cover 113 of orienter mechanism 104. The brackets 117 and 118 coact with latches 80, thus causing mold ring 12 to stop when proper orientation has been achieved.

Figure 3:
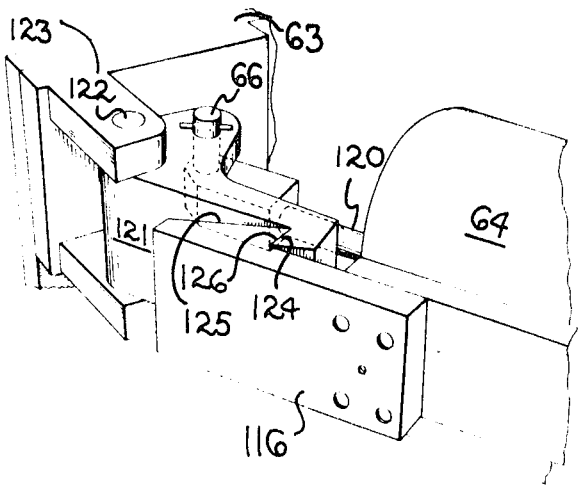
FIG. 3 is an enlarged view of the latch mechanism associated with the grasping arms as shown in FIG. 1.

FIG. 3 is an enlarged perspective view showing the locking arrangement that has been provided to keep arms 62 and 63 locked together when the arms are supporting and translating mold ring 12 from one position to another. The body portion of actuator 64 is shown in FIG. 3. A latch bar 116 is fastened to the exterior of actuator 64 and extends in a direction parallel to piston rod 120. Piston rod 120 is pivotally coupled with latch 121 at attachment point 66. Latch 121 is pinned by pin 122 to clevis 123. Clevis 123 is attached to the inside surface of arm 63. It is important that arms 62 and 63 do not lose their grasp upon a mold ring that is being translated in an no-linear path from one location to another location The mass of mold ring 12 is quite substantial and the inertial loads are such that arms 62, 63 may be forced from their closed position unless a positive coupling is maintained between said arms. As piston rod 120 is retracted by actuator 64, the dog 124 of latch 121 is caused to slide up the inclined surface 125 of latch bar 116 until dog 124 is positively engaged with the reentrant portion 126 of latch bar 116. Dog 124 is held firmly against latch bar 116 because of the offset between pin 122 and attachment point 66. While it is important that arms 62 and 63 are held in locked position with respect to each other while they are transporting a mold ring, it is just as important to provide for a positive release of the lock mechanism when arms 62 and 63 are ready to deposit a mold ring. As piston rod 120 is extended from actuator 64, attachment point 66 will move in a counterclockwise direction around pin 122. The rotation of latch 121 in a counterclockwise direction causes dog 124 to be pulled free from the reentrant portion 126 of latch bar 116 thereby releasing the positive lock previously achieved between arms 62 and 63.

FIG. 4 is an enlarged view of another lock mechanism that offsets the shifting of mold ring 12 as it is being translated from one position to another. As arms 62 and 63 translate a mold ring through substantial acceleration and deceleration, and since the mass of the mold ring is not uniformly distributed about its central axis, the mold ring may rotate in an undesirable manner. To prevent undesired rotation of the mold ring during translation, an indexing aperture 130 has been provided in the top surface of cylindrical section 75. Pivot casting 33 is shown at the top of FIG. 4. Pivot triangle 55, which moves relative to pivot casting 33 is shown with bracket 130 cantilevered horizontally toward cylindrical section 75. A housing 132 is attached to the end of bracket 130. Housing 132 is of hollow configuration and contains indexing pin 133. Indexing pin 133 is slightly smaller in diameter than indexing aperture 130; therefore, it will fit within the confinement of aperture 130 when mold ring 12 is properly oriented. Bar 134 is attached to the top of indexing pin 133 and it coacts with adjacent structure in the following manner. A support member 135 is attached by means (not shown) to the bottom side of pivot casting 33. A sliding release bar 136 is mated within notched out section 139 of support member 135. A lift platform 140 is attached to the lower extremity of release bar 136. Lift platform 140, which does not revolve with pivot triangle 55, is fixed at an elevation below bar 134 so that bar 134 is free to pass over the top surface thereof without interference. The top end of release bar 136 is attached to a piston rod 141. Piston rod 141 forms part of actuating mechanism 142 which is anchored to the top of support member 135. A push bar 143 is also attached to and parallels release bar 136. Push bar 136 terminates just above the top surface of bar 134. During operation, bar 134, which is attached to pivot triangle 55 and rotates with arms 62 and 63 swings into position between lift plate 140 and push bar 143. At this time, indexing pin 133 is in the up position as is the piston within actuating mechanism 142. After the mold ring 12 has been completely oriented by ring orienter 81, push bar 143 is directed downward against the top of bar 134 thus driving indexing pin 133 into indexing aperture 130. In similar fashion, indexing pin 133 can be disengaged with aperture 130 by the upward biasing force of lift platform 140.

OPERATION OF THE INVENTION

The following discussion is directed toward a better understanding of the sequential steps through which the present invention operates. As has been previously pointed out the apparatus of the present invention is used in conjunction with a centrifugal casting machine that possesses the capability of producing glass articles such as television tube funnels.

The centrifugal casting machine, to which the present invention is attached indexes from station to station thus causing funnel molds such as 11 to be brought one by one beneath the arms 62, 63 at station A. Likewise, as a funnel mold moves arcuately into station A, the funnel mold already at station A progresses to station B. As an empty, already oriented funnel mold is moved into position at the station preceding station A, a gob of molten glass is dropped into the funnel from an overhead molten glass supply. The table of the centrifugal casting machine beneath the apparatus of the present invention is indexed to a new position while traveling in a counterclockwise direction when viewed from above. The indexing of the table carrying the funnel molds, positions the funnel mold containing the molten glass gob directly beneath the arms 62, 63 at station A. The piston of actuator 31 is extended, thus causing the main column 24 and attached pivot casting to drop a predetermined distance. An already oriented mold ring 12, held by arms 62, 63 and locked in proper position by indexing pin 133 is lowered into engagement with the top of mold 11. Arms 62, 63 are then moved to their open position through the extension of piston rod 120 of actuator 64. A vertically aligned plunger which is part of the previously referred to centrifugal casting machine is lowered down through cylindrical section 75 of mold ring 12. The plunger is of generally frusto-pyramidal configuration and the flutes on the corners thereof are aligned in diagonal relationship with mold 12. The pressing of the gob of glass forms precisely the interior apex portion of the funnel and also displaces the remainder of the glass toward the interior surface of the funnel mold where it can be acted upon more readily by the applied centrifugal forces of the spinning funnel mold. The plunger is retracted from the area of funnel mold 11 and also ring 12 and the mold and rings are then spun. A signal is again given to the fluid control system associated with actuator 31 and the pivot casting 31 is raised in elevation along with the three sets of arms 62, 63 attached thereto. The centrifugal casting machine table once again indexes and the funnel mold containing the completely formed glass funnel is moved from station A to station B. While all three sets of arms 62, 63 are in the elevated position, the arms at stations B and C are closed. As soon as the spinning mold has indexed from station A to station B and while all arms 62, 63 are in the raised position, actuator 36 is activated and through the extension of its piston rod 42, the entire pivot casting 33 is rotated about main column 24. By moving the entire pivot casting laterally under the influence of actuator 36 ample clearance is gained so that arms 62, 63 may rotate without contacting the main structure of the centrifugal casting machine. FIG. 2 shows that arms 62, 63 would interfere with the main casting 145 if the entire pivot casting 33 was not moved away from main casting 145. As soon as pivot casting 33 has been moved away from the main structure 145 of the centrifugal casting machine, motor 53 is activated and support shaft 46 and the three sets of arm 62, 63 are rotated in a clockwise direction through 120°. Upon completion of rotation of all three sets of arms 62, 63, the pivot casting 33 is then rotated back toward the main casting 145.

During the above-mentioned rotation, arms 62, 63, which were opened to release the oriented mold ring upon the funnel mold at station A, remain open as they swing from station A to station B. The open arms 62, 63 are lowered at station B and engage with flange 73 of mold ring 12 at station B just as the funnel mold stops spinning. Arms 62, 63 are then ready to lift the unoriented mold ring from the funnel mold that contains a newly formed still partially molten glass funnel. It is, of course, understood from the aforegoing discussion that all three sets of arms are raised, lower and rotated simultaneously.

During normal operation there are only three mold rings involved with up to, for example, eight funnel molds. Mold rings are moved from station B to station C and from station C to station A by the apparatus of the present invention. The mold rings are carried from station A to station B while coupled to the molds associated with the centrifugal casting machine.

When the pivot casting 33 is in the up position and when it rotates through 120 degree intervals, the unoriented mold ring picked up from the funnel mold at station B is translated to station C where it is positioned over turntable 114 of ring orienter 81. The lowering of pivot casting 33 and all three sets of arms deposits the unoriented mold ring upon turntable 114 which is rotating in a counterclockwise direction. The unoriented mold ring begins to rotate and continues to do so for not over 180° until latches 80, which are attached to the long ends of mold ring 12, contact stop brackets 117 and 118. The mold ring is oriented when latches 80 butt against stops 117 and 118. Turntable 114 continues to rotate with constant angular velocity, powered by motor 112. The lower extremity of cylindrical section 76 is especially hardened to withstand the frictional wear as turntable 114 continues to rotate after the mold ring 12 has been completely oriented. Arms 62, 63 do not normally open at the orienting station C; they merely drop down so that flanges 72, of the arms, do not engage with top flange 73 of cylindrical section 75. During the next cycle of the apparatus, the oriented ring is lifted from its location on top of turntable 114 and is transported to the oriented mold at station A.

The above-discussion and description sets forth the various steps through which the present apparatus operates during normal production runs. There are certain instances when the mold ring must be lifted from the funnel mold at station B before the mold ring at station C is completely oriented. This is necessary since the funnel mold and the still molten glass funnel must be spun additionally after it has been formed in order to preserve its newly formed configuration. When it is necessary to pick up a mold ring from the mold at station B before the mold ring at station C is completely oriented, the entire pivot casting 33 and all three sets of arms 62, 63 are raised including the partially oriented mold ring at station C. Motor 91 is activated thus raising support plate 90 and the turntable 114 in elevation. The constantly revolving turntable 114 then makes contact with the bottom edge of cylindrical section 76 and mold ring 12 is rotated until completely oriented. As soon as the mold ring 12 is oriented, the direction of motor 91 is reversed and turntable 114 is lowered in elevation. The completely oriented mold ring can then be transported arcuately to station A. The translation of oriented mold ring 12 can be achieved as soon as the top of turntable 114 clears bottom flange 76 of the mold ring assembly.

The above-described method of operation permits a mold ring to be removed from the mold at station B even though the previously removed mold ring, which is at station C, has not been completely oriented. It will be appreciated that when the partially oriented mold ring has been lifted at station C to accommodate rapid removal of the mold ring from the newly formed glass article at station B, there will be a period where turntable 114, at station C, will not be in contact with the mold ring; hence, orienting cannot continue until the turntable 114 is elevated up to the mold ring.

An alternate method which assures continued orienting of the mold ring at station C is as follows. The unoriented mold ring is picked up from the newly formed glass article at station B as previously described. When the pivot casting is raised to lift the mold ring at station B, the arms 62, 63 at station C also raise. Instead of letting arms 62, 63 in the closed position and thus raising the partially oriented mold ring from contact with the turntable 114, arms 62, 63 are moved to the open position and move quickly upward. The mold ring is left in contact with the revolving turntable and the turntable is raised. Flange 73 of the mold ring assembly will be raised up through open arms 62, 63. Arms 62, 63 are then closed upon flange 73, the entire weight of the mold ring is supported therefrom, and the turntable 114 is lowered to provide clearance for rotation of pivot triangle 55 and all associated arms 62, 63.

The heretofore detailed description of the present invention describes how glass funnels can be made and how the mold ring can be separated in a minimum time interval before detrimental deformation can occur to the newly formed still molten glass article.

Throughout this specification, the actual electrical, hydraulic, and pneumatic connections along with all of the timed sequential control of the present invention have been omitted since it is within the purview of those skilled in the art to cause each part of the present invention to perform in the heretofore indicated manner.

While certain representative embodiments and details have been shown for the purpose of illustrating the invention, it will be apparent to those skilled in this art that various changes and modifications may be made therein without departing from the spirit or scope of the invention.

What is claimed is:

1. In an apparatus for orienting a mold ring of a centrifugal mold for casting a hollow article of generally annular configuration, the improvement comprising a centrifugal casting machine, supported by frame means, a support member attached to said frame means and journaled for rotational and translatory movement, a drive shaft rotationally mounted within said support member and coupled with drive means, an attachment block connected to said drive shaft, a plurality of pairs of grasping arms supported from the attachment block, each pair of arms pivotally cantilevered in spaced apart array to permit engagement and disengagement with a mold ring, ring rotating means positioned adjacent said arms to engage a mold ring for orienting, means attached to said support member to translate said support member in a vertical direction, means attached to said support member to translate said support member in a horizontal direction, means attached to said arms to cause their cantilevered ends to move with respect to each other to engage and release a mold ring interdisposed between said arms, means coupled with said ring rotating means to stop the rotation of said ring when a predetermined attitude has been attained.

2. In an apparatus for orienting a mold ring of a centrifugal mold for casting a hollow glass article such as a television tube funnel of generally frusto-pyramidal configuration, the improvement of comprising a centrifugal casting machine supported by frame means, a main support column supported in an upright attitude by said frame means, means connected between said frame means and said support column to cause relative movement therebetween, a support member attached to said main support column, means connected between said frame means and said support member to cause the support member to pivot about the longitudinal axis of said main support column, a drive shaft rotationally mounted within said support member and coupled with motor drive means attached to said support member, an attachment block connected to the lower extremity of said drive shaft, a plurality of pairs of grasping arms supported from said attachment block, each pair of arms pivotally cantilevered in spaced apart array to permit engagement and disengagement with a mold ring, actuator means connected to said arms to cause them to pivot about their supports so that the extremities of said arms remote from their supported ends will move with respect to each other thus permitting said arms to engage a mold ring that is to be oriented, ring rotating means positioned beneath said arms so that a mold ring may be deposited thereon, means coupled with said ring rotating means to stop the rotation of said ring when a predetermined attitude has been attained.

3. In an apparatus for orienting a mold ring of a centrifugal mold for casting a hollow glass article of generally frusto-pyramidal configuration, the improvement comprising a centrifugal casting machine, supported by frame means, said frame means containing apertured bosses in spaced apart relationship, a main support column rotatably mounted within the apertures of said bosses, actuator means attached between the frame means and the main support column so that the support column can be moved in an axial direction, a support member attached to said main support column, actuator means connected between said frame means and said support member to cause said support member to pivot about the longitudinal axis of said main support column, a drive shaft rotationally mounted within said support member, drive means attached to said drive shaft, motor means connected to said drive means to cause the drive shaft to rotate, an attachment block connected to the lower extremity of said drive shaft, a plurality of pairs of grasping arms supported from said attachment block, each pair of arms pivotally cantilevered in a generally radially outward direction from the longitudinal axis of the drive shaft, said arms equipped with means to sequentially engage and disengage a mold ring, actuator means mounted to and between each pair of co-acting arms to cause them to pivot about their support points on the attachment block so that the extremities of said arms will move with respect to each other thus permitting said arms to engage a mold ring that is to be translated and oriented, ring rotating means positioned beneath the path traversed by said arms as they rotate, said roating means containing a turntable for orienting the mold ring, means coupled with said ring rotating means to stop the rotation of said ring when a predetermined attitude has been attained.

4. In combination an orienting apparatus and a mold ring which forms the top portion of a mold utilized in the formation of a hollow glass article such as a television tube funnel of generally frusto-pyramidal configuration, said orienting apparatus comprising a frame for supporting a centrifugal casting machine, said frame of an elongate configuration with cantilevered apertured support bosses positioned at the ends thereof, a main support column rotatably mounted within the apertures of the support bosses of said frame, an actuator axially aligned with the main support column and interconnected between said frame and said column so that the main support column can be moved in a substantially vertical direction, a support member attached in cantilevered fashion to that portion of the main support column that lies between the bosses of said support frame, an actuator interdisposed between said frame and the support member to cause said support member to pivot about the longitudinal axis of the main support column, a vertically aligned drive shaft mounted within the cantilevered portion of said support member, a drive gear attached to said drive shaft, a motor mounted from said support member to drive said drive shaft by means of the attached drive gear, an attachment block connected to the lower extremity of said drive shaft, a plurality of pairs of grasping arms supported from said attachment block, each pair of arms positioned circumferentially equal distances from each other and cantilevered in a generally radially outward direction from the longitudinal axis of the drive shaft, said arms having flanges thereon for engagement and disengagement with a complementary flange on said mold ring, an actuator mounted to and between each pair of co-acting arms to cause them to pivot about their support points on the attachment block so that the extremities of said arms will move toward and away from each other thus permitting the flanges on said arms to engage and disengage with the complementary flange on a mold ring that is to be translated and oriented, a mold ring rotating turntable positioned beneath the path traversed by said arms as they move with said drive shaft, said mold ring rotating turntable having frame means with a turntable mounted on the top thereof, said turntable interconnected to a motor mounted on said frame means, said turntable having a periphery for mating with an aperture in the mold ring, mold ring orienting stops attached to said frame means to stop the rotation of said mold ring when the mold ring has been oriented to the desired attitude.

5. An apparatus as claimed in claim 4 wherein the turntable can be raised and lowered in a substantially vertical direction by gear means attached to said frame means.

6. An apparatus as claimed in claim 4 wherein a locking means is provided between each pair of arms to prevent their opening when a mold ring is being translated from the turntable to an oriented mold mounted on the centrifugal casting machine.

7. An apparatus as claimed in claim 4 wherein lock means is coupled with each pair of arms to prevent rotation of a mold ring with respect to the arms while the mold ring is being translated subsequent to being oriented.

8. A method of orienting a mold ring utilized with a mold, said method comprising the steps of;
(1) grasping by means of a pair of arms, an unoriented mold ring at the top portion thereof,
(2) moving the mold ring in a vertical direction away from the mold,
(3) translating said mold ring through a non-linear path to an orienter apparatus,
(4) lowering said mold ring until it indexes with said orienter apparatus,
(5) releasing the mold ring from the confinement of said arms, (6) rotating said mold ring through no more than 180 degrees until a predetermined orientation has been achieved, (7) lifting the oriented mold ring from the orienter apparatus, (8) translating the oriented mold ring from the orienter apparatus to a mold at a station remote from the station where the ring was originally grasped, (9) lowering the oriented mold ring onto an oriented mold, and

(10) releasing the mold ring from the confinement of said arms so that the oriented and coupled together mold and mold ring can be used for the centrifugal casting of a glass article.

9. The method of centrifugally casting hollow articles by the manipulation of a plurality of molds and mold rings from station to station including the steps of;

(1) depositing a gob of molten material into a mold, (2) translating the mold containing the molten material to a station adjacent a ring orienting and translating apparatus, (3) depositing an oriented mold ring on the mold containing the molten material, (4) simultaneously with the depositing of said oriented mold ring, depositing an unoriented mold ring at an orienting station, outside the arcuate path traversed by said molds, (5) spinning the mold and attached mold ring to distribute the molten material contained therein to form the desired article, (6) lifting the oriented mold ring at the orienting station and simultaneously lifting the mold ring from the mold that immediately preceded the mold which has just been spun, (7) translating the mold containing the centrifugally formed article to a station where the mold ring can be removed, and (8) cooling the newly formed article so that it can be removed from the mold.

10. The method of centrifugally casting hollow glass articles by the manipulation of a plurality of molds that travel from station to station in an arcuate path and mold rings that travel from station to station in a partially different path, including the steps of;

(1) inserting a gob of molten glass into a mold, (2) translating the mold containing the molten glass to a station adjacent a ring orienting and translating apparatus, (3) depositing an oriented mold ring on the mold containing the molten glass, (4) simultaneously with the depositing of said oriented mold ring, depositing an unoriented mold ring at an orienting station outside the arcuate path of travel of said molds, (5) lowering a plunger through an aperture in the mold ring that rests upon the mold containing the molten glass to partially form the glass article, (6) raising the plunger from contact with the molten glass, (7) spinning the mold and attached mold ring to complete the distribution of the molten glass within the mold, (8) simultaneously with the spinning of said mold, orienting the unoriented mold ring at the orienting station, (9) lifting the oriented mold ring at the orienting station and simultaneously lifting the mold ring from the mold that immediately preceded the mold which has just been spun,

(10) translating the mold containing the centrifugally formed article to a station where the mold ring can be removed, and

(11) cooling the newly formed article so that it can be removed from the mold.

11. The method of centrifugally casting frusto-pyramidal glass articles by the manipulation of a plurality of molds that travel from station to station in an arcuate path and mold rings that travel from station to station in a partially different path, including the steps of;

(1) dropping a gob of molten glass into a mold, (2) translating the mold containing the molten glass to a station adjacent a ring orienting and translating apparatus, (3) depositing an oriented mold ring on the mold containing the molten glass, (4) simultaneously with the depositing of said oriented mold ring, depositing an unoriented mold ring on an orienting apparatus at an orienting station outside the arcuate path of travel of said molds, (5) lowering a plunger through an aperture in the mold ring that rests upon the mold containing the molten glass to partially form the glass article, (6) raising the plunger from the confinement of the mold, (7) spinning the mold and attached mold ring to complete the distribution of the molten glass within the mold, (8) simultaneously with the spinning of said mold, commencing the orienting of the unoriented mold ring at the orienting station, (9) lifting the mold ring from the mold that immediately preceded the mold which has just been spun, simultaneously opening the arms adjacent the mold ring at the orienting station so that the arms are free to be raised,

(10) raising the mold ring while it is being oriented at the orienting station,

(11) grasping the mold ring at the orienting station after it has been oriented,

(12) translating the mold containing the centrifugally formed article to a station where the mold ring can be removed, and

(13) cooling the newly formed article so that it can be removed from the mold.

References Cited

UNITED STATES PATENTS

| | | | |
|---|---|---|---|
| 3,132,018 | 5/1964 | Pendergast et al. | 65—302 |
| 3,293,024 | 12/1966 | Luertzing | 65—302 |
| 3,459,527 | 8/1969 | Peterson et al. | 65—302 |

S. LEON BASHORE, Primary Examiner

R. L. LINDSAY, Jr., Assistant Examiner

U.S. Cl. X.R.

18—26; 65—72, 302, 307, 361; 264—311